Patented July 16, 1940

2,207,901

UNITED STATES PATENT OFFICE 2,207,901

PROCESS FOR REMOVING DISSOLVED COPPER FROM CHLOROPRENE

Norman C. Somers, Carneys Point, and Lowry S. Danser, Salem, N. J., assignors to E. I. du Pont de Nemours & Company, Wilmington, Del., a corporation of Delaware No Drawing. Application December 30, 1938, Serial No. 248,516

12 Claims. (Cl. 260—655)

This invention relates to the purification of unsaturated organic compounds. More particularly it relates to a method for removing impurities from chloro-2-butadiene-1,3 (hereinafter for convenience called "chloroprene").

A preferred method for preparing chloroprene involves reacting monovinylacetylene with hydrogen chloride in the presence of an aqueous cuprous chloride catalyst. The product of this reaction is ordinarily subjected to a stripping treatment to remove most of the vinylacetylene. The product remaining after this stripping treatment is for convenience herein designated "crude chloroprene." It still contains a number of impurities among which there are known to be small amounts of dichlorobutene, monovinylacetylene, and acetaldehyde, along with an appreciable amount of dissolved or combined copper. It is desirable to remove as much of this dissolved or combined copper as possible particularly where the chloroprene is to be used for the preparation of rubber-like polymers since small amounts of copper adversely affect the polymerization of chloroprene and impair the aging properties of rubber-like polymers prepared from such chloroprene.

It is an object of this invention to purify such crude chloroprene. A further object of this invention is to prepare from such crude chloroprene an improved chloroprene for the purpose of preparing rubber-like polymers. A more specific object of the invention is to remove the dissolved or combined copper from such crude chloroprene insofar as possible. Other objects will appear hereinafter.

It has now been found that these objects may be accomplished by treating chloro-2-butadiene-1,3 containing copper, such as the crude chloroprene described above, with a metal above copper in the electromotive series. The preferred procedure involves treating the crude chloroprene with such metals in a finely divided state, for example, with a fine grade of zinc dust. The chloroprene and the metal may be brought into contact in any desired manner but they are preferably agitated together in order to increase the effectiveness of the treatment. The preferred procedure also involves the use of activated carbon along with the metal, which as disclosed above is preferably zinc.

The following examples describe in detail the manner in which the treatment is effected. These examples are included for purposes of illustration only and therefore they are not intended to be construed as limiting the scope of the invention. The term "parts" whenever hereinafter used means "parts by weight" unless otherwise indicated.

Example 1

A mixture of 1000 parts of crude chloroprene and 20 parts of zinc dust are agitated for 15 minutes in a vessel open to the air, the temperature being held at 0° C. The suspension is then filtered at the same temperature to remove all solid matter. The effectiveness of this procedure is enhanced by adding 2 parts of activated carbon ("Darco") with the zinc dust.

The conditions set forth in Example 1 are preferred. They may be varied, however, in either direction. Thus, in general, the amount of zinc dust may be varied from about 0.5% of the crude chloroprene upwards, the time of contact may be varied upward from about one minute, and the temperature may be varied between about $-40°$ C. and $+40°$ C. The quantity of activated carbon to be employed is also not limited to that specified in Example 1. Any desired quantity may be used or as is apparent from the above description the process may be carried out in the absence of activated carbon.

Furthermore the invention is not limited to the use of a fine grade of zinc dust as employed in Example 1. Other forms of zinc, such as coarse zinc dust, granulated zinc, and zinc sponge may be substituted for the fine zinc dust but with increasing particle size, a larger amount of metal is required and a longer period of agitation or contact time is necessary in order to obtain equivalent results. For example, 10% of spongy zinc is preferably agitated with crude chloroprene for at least an hour to obtain a product corresponding in properties to that obtained in Example 1.

The zinc treatment may also be carried out continuously in the manner illustrated in Example 2.

Example 2

An 8 ft. glass tube of 4 mm. inside diameter is packed with 20 mesh granulated zinc. Crude chloroprene at 20° C. is passed through the tube at a velocity such that the contact time is from 10 to 15 minutes. It will be understood that the variations of temperature and contact time set forth above apply as well to the continuous method as to the batch method of operation.

As indicated in the general statement of invention it is also possible to substitute for zinc other metals standing above copper in the electromotive series. These other metals are, however, somewhat less effective than zinc.

Thus, as illustrated in Example 3, finely divided sodium, finely powdered iron or magnesium or fine steel wool may be used to treat crude chloroprene by procedures such as those specifically described with reference to zinc either batchwise or continuously.

*Example 3*

20 parts of finely divided sodium, (100 to 200 mesh), is added to 1000 parts of crude chloroprene. The mixture is agitated at 0° C. for 30 minutes and the solid matter removed by filtration or decantation.

The treatment prescribed herein is believed to have a number of beneficial effects. The most outstanding, however, is the removal of copper. Thus, crude chloroprene which has been treated as above is rendered substantially copper-free, its copper content being reduced to about 1 part per million. This removal of copper is of great significance in view of the facts that small amounts of copper not only adversely affect the polymerization of chloroprene but also impair the aging quality of rubber-like chloroprene polymers. The wide utility of this process becomes obvious when it is realized that most known commercial methods for making chloroprene entail the use of copper compounds with the result that the chloroprene obtained is nearly always contaminated with copper.

Because the crude chloroprene polymerizes so slowly and yields rubber-like polymers which have certain undesirable properties it has long been the practice to refine it before it is polymerized. Heretofore this purification has been effected by distillation. The disadvantage of this procedure is that it is accompanied by a loss of about 5% to about 10% of the chloroprene due to uncontrollable polymerization in the still.

By treating crude chloroprene with metals, zinc in particular, as described above, a product is obtained which may be polymerized to rubber-like materials satisfactorily and without further refining. The elimination of the necessity for purifying crude chloroprene by distillation makes possible marked economies in equipment and avoids the loss of chloroprene during distillation.

It is apparent that many widely different embodiments of this invention may be made without departing from the spirit and scope thereof and therefore it is not intended to be limited except as indicated in the appended claims.

We claim:

1. A process for purifying chloroprene containing copper which comprises treating such chloroprene with a finely divided metal above copper in the electromotive series.

2. A process for purifying crude chloroprene containing copper which comprises bringing such crude chloroprene into intimate contact with a finely divided metal above copper in the electromotive series and removing the purified chloroprene from contact with said metal.

3. A process for purifying crude chloroprene containing copper which comprises bringing such crude chloroprene into intimate contact with finely divided zinc.

4. The process of claim 3, further characterized in that at least 0.5% of zinc, by weight, based on the chloroprene, is employed and in that the contact time is at least one minute.

5. The process of claim 3, further characterized in that the crude chloroprene is brought into contact with a small amount of activated carbon along with the finely divided zinc.

6. The process of claim 3, further characterized in that the crude chloroprene is brought into intimate contact with a small amount of activated carbon along with the finely divided zinc and in that at least about 0.5% of zinc, by weight, based on the chloroprene, is employed and in that the contact time is at least one minute.

7. In a process for preparing chloroprene which involves passing monovinylacetylene into contact with an aqueous cuprous chloride catalyst and then stripping most of the monovinylacetylene from the resulting product, the step of purifying the resulting product which comprises bringing it into and then out of intimate contact with finely divided zinc.

8. A process for purifying crude chloroprene containing copper which comprises bringing such crude chloroprene into and then out of intimate contact with zinc dust.

9. The process of claim 8, further characterized in that the crude chloroprene is brought into contact with a small amount of activated carbon along with the zinc dust.

10. A process for purifying crude chloroprene which comprises bringing it into intimate contact with at least about 0.5%, by weight, based on the chloroprene, of zinc dust along with a small amount of activated carbon for at least one minute at a temperature of about −40° C. to about +40° C.

11. A process for purifying crude chloroprene which comprises agitating it with about 2%, by weight, based on the chloroprene, of zinc dust along with about 0.2%, by weight, based on the chloroprene, of activated carbon for about 15 minutes at a temperature of about 0° C.

12. A process for continuously purifying crude chloroprene which comprises passing it into and out of contact with granulated zinc at a temperature of about 20° C. and at such a rate that the contact time is from about 10 minutes to about 15 minutes.

NORMAN C. SOMERS.
LOWRY S. DANSER.